United States Patent [19]
Delp et al.

[11] Patent Number: 5,996,013
[45] Date of Patent: Nov. 30, 1999

[54] METHOD AND APPARATUS FOR RESOURCE ALLOCATION WITH GUARANTEES

[75] Inventors: Gary Scott Delp, Rochester, Minn.; Roch A. Guerin, Yorktown Heights, N.Y.; Philip Lynn Leichty, Rochester, Minn.; Vinod Gerard John Peris, Croton-on-Hudson; Rajendran Rajan, North Tarrytown, both of N.Y.; Albert Alfonse Slane, Oronoco, Minn.

[73] Assignee: International Business Machines Corporation, Armonk, N.Y.

[21] Appl. No.: 08/845,967

[22] Filed: Apr. 30, 1997

[51] Int. Cl.$^6$ ...................................................... G06F 15/16
[52] U.S. Cl. ........................... 709/226; 709/233; 370/232
[58] Field of Search .................................... 370/234, 254, 370/450, 230, 232; 379/243, 220, 221, 244; 395/200.56, 200.54; 709/226, 233, 232

[56] References Cited

U.S. PATENT DOCUMENTS

| | | | |
|---|---|---|---|
| 4,450,554 | 5/1984 | Steensma et al. | 370/4 |
| 4,855,996 | 8/1989 | Douskalis | 370/84 |
| 5,007,043 | 4/1991 | van den Dool et al. | 370/60 |
| 5,224,092 | 6/1993 | Brandt | 370/17 |
| 5,274,644 | 12/1993 | Berger et al. | 370/230 |
| 5,276,681 | 1/1994 | Tobagi et al. | 370/85.4 |
| 5,313,467 | 5/1994 | Varghese et al. | 370/94.1 |
| 5,361,257 | 11/1994 | Petersen | 370/60.1 |

(List continued on next page.)

OTHER PUBLICATIONS

Lixia Zhang et al., RSVP: A New Resource ReSerVation Protocol, IEEE Network, pp. 8–18, Sep. 1993.

Anwar Elwalid et al., A New Approach for Allocating Buffers and Bandwidth to Heterogeneous Regulated Traffic in an ATM Node, IEEE Journal on Selected Areas of Communications, vol. 13, No. 6, pp. 1115–1127, Aug. 1995.

"Analysis of Shared Finite Storage in a Computer Network Node Environment Under General Traffic Conditions", by Farouk Kamoun et al., IEEE Transactions on Communications, vol. COM–28, No. 7, pp. 992–1003, Jul. 1980.

"ATM Forum Technical Committee Traffic Management Specification", Version 4.0 (af–tm–0056.000) Apr., 1996.

"Resource ReSerVation Protocol (RSVP)" Version 1, Internet Draft Document, "Functional Specification of the Internet Engineering Task Force (IETF)", Dated Mar. 18, 1996.

*Primary Examiner*—Zarni Maung
*Assistant Examiner*—Patrice L. Winder
*Attorney, Agent, or Firm*—Joan Pennington

[57] ABSTRACT

A method and apparatus are provided for resource allocation with guarantees. A resource allocator is coupled to a controller. The resource allocator allocates resources between a plurality of arrival processes. A dedicated resource pool and a shared resource pool are provided. When an arrival process is identified, the resource allocator obtains a predefined characterizing value for the identified arrival process. Responsive to the obtained predefined characterizing value, resource from one of the dedicated resource pool or the shared resource pool is allocated to the arrival process. The controller is utilized for tracking resource use and for providing the predefined characterizing value for each of the plurality of arrival processes. The dedicated resource pool has a predetermined capacity greater than or equal to the total of all the low threshold values for each of the arrival processes. The dedicated resource pool provides the guarantees with the shared pool providing statistical multiplexed resource use. The controller increments a usage charge for the arrival process when a resource is allocated and decrements the usage charge at the end of use of the allocated resource. The controller evaluates use for the identified arrival process and updates the predefined characterizing value.

14 Claims, 9 Drawing Sheets

U.S. PATENT DOCUMENTS

| | | | |
|---|---|---|---|
| 5,452,115 | 9/1995 | Tomioka | 359/123 |
| 5,455,825 | 10/1995 | Lauer et al. | 370/60 |
| 5,455,826 | 10/1995 | Ozveren et al. | 370/60 |
| 5,488,610 | 1/1996 | Morley | 370/82 |
| 5,506,844 | 4/1996 | Rao | 370/84 |
| 5,541,926 | 7/1996 | Saito et al. | 370/94.2 |
| 5,548,587 | 8/1996 | Bailey et al. | 370/60.1 |
| 5,555,244 | 9/1996 | Gupta et al. | 370/60.1 |
| 5,557,318 | 9/1996 | Gabriel | 348/7 |
| 5,557,611 | 9/1996 | Cappellari et al. | 370/60.1 |
| 5,596,576 | 1/1997 | Milito | 370/450 |
| 5,781,624 | 7/1998 | Mitra et al. | 379/221 |
| 5,799,002 | 8/1998 | Krishman | 370/234 |

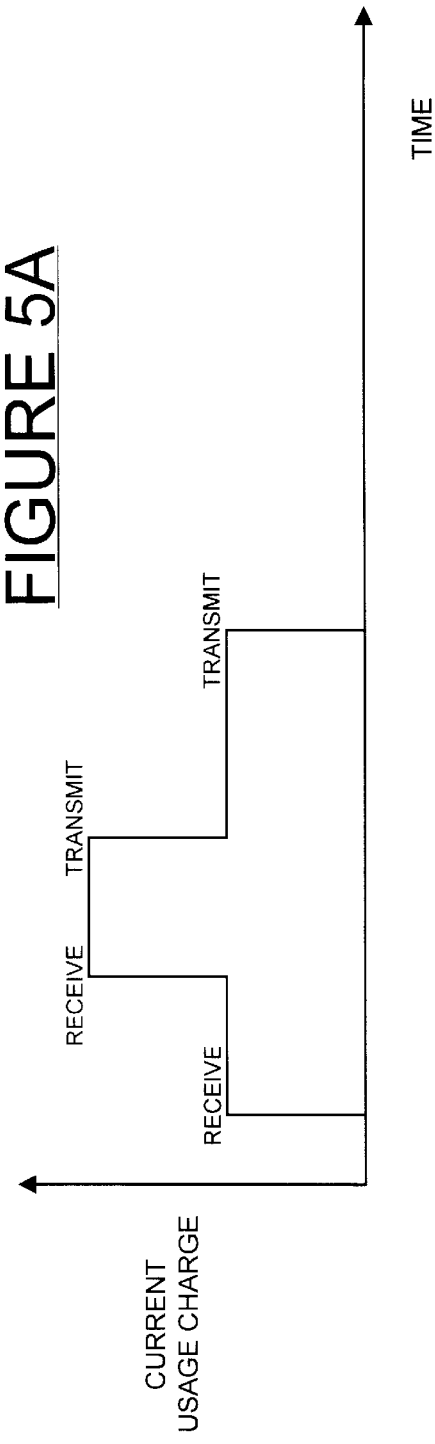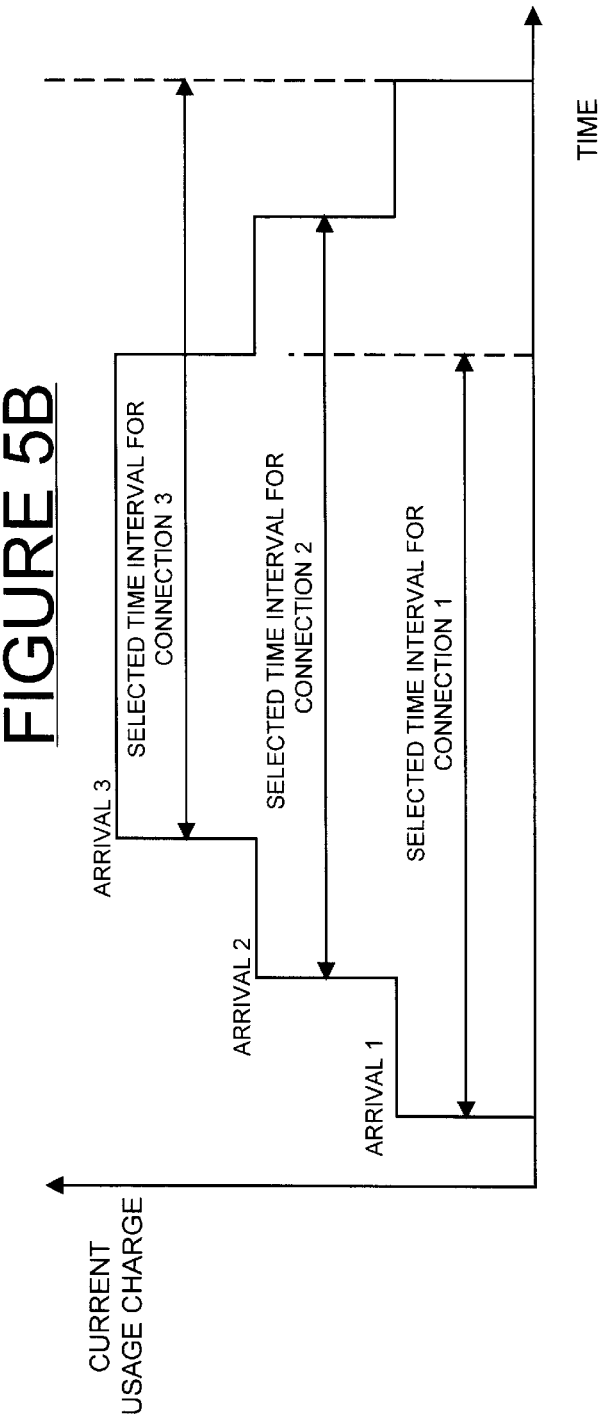

METHOD AND APPARATUS FOR RESOURCE ALLOCATION WITH GUARANTEES

FIELD OF THE INVENTION

The present invention relates generally to the data processing field, and more particularly, relates to a method and apparatus for resource allocation with guarantees for a plurality of arrival processes in a computer communications network system.

DESCRIPTION OF THE PRIOR ART

An Asynchronous Transfer Mode (ATM) network described in "Asynchronous Transfer Mode: Solution for Broadband ISDN", M de Prycker, Ellis Horwood, 1991 is an internationally agreed upon technique for transmission, multiplexing and switching in a broadband network. ATM networks are designed to support the integration of high quality voice, video, and high speed data traffic. ATM networks use fixed size cells as a unit of transmission. As technology increases, it is expected that the Asynchronous Transfer Mode (ATM) technology and ATM networks will supply much of the need for high speed multimedia.

In some communication systems, such as an asynchronous transfer mode (ATM) communications network, data packets are received from the network in small units called cells with arrival times interleaved with cells from other data frames. The cells are assembled to form larger data units called frames or packets.

Sharing resources among many users, such as, bandwidth for carrying data communications and memory for storing data for a digital data communications network, multimedia or other system, presents challenges to define both techniques for sharing and fairness.

SUMMARY OF THE INVENTION

A principal object of the present invention is to provide an improved method and apparatus for resource allocation with guarantees. Other important objects of the present invention are to provide such method and apparatus that overcome some disadvantages of prior art arrangements substantially without negative effects.

In brief, method and apparatus for resource allocation with guarantees are provided. A resource allocator is coupled to a controller. The resource allocator allocates resources between a plurality of arrival processes. A dedicated resource pool and a shared resource pool are provided. When an arrival process is identified, the resource allocator obtains a predefined characterizing value for the identified arrival process. Responsive to the obtained predefined characterizing value, resource from one of the dedicated resource pool or the shared resource pool is allocated to the arrival process. The controller is utilized for tracking resource use and providing the predefined characterizing value for each of the plurality of arrival processes.

In accordance with features of the invention, the dedicated resource pool has a predetermined capacity greater than or equal to the total of all the low threshold values for each of the arrival processes. The dedicated resource pool provides the guarantees with the shared pool providing statistical multiplexed resource use. The controller increments a usage charge for the arrival process when a resource is allocated and decrements the usage charge at the end of use of the allocated resource. The controller evaluates use for the arrival process and updates the predefined characterizing value.

BRIEF DESCRIPTION OF THE DRAWINGS

The present invention together with the above and other objects and advantages may best be understood from the following detailed description of the preferred embodiments of the invention illustrated in the drawings, wherein:

FIGS. 5A, 5B, and 5C are charts illustrating sequential operations performed by resource allocator and controller of the preferred embodiment.

DETAILED DESCRIPTION OF THE PREFERRED EMBODIMENTS

Figure 1:
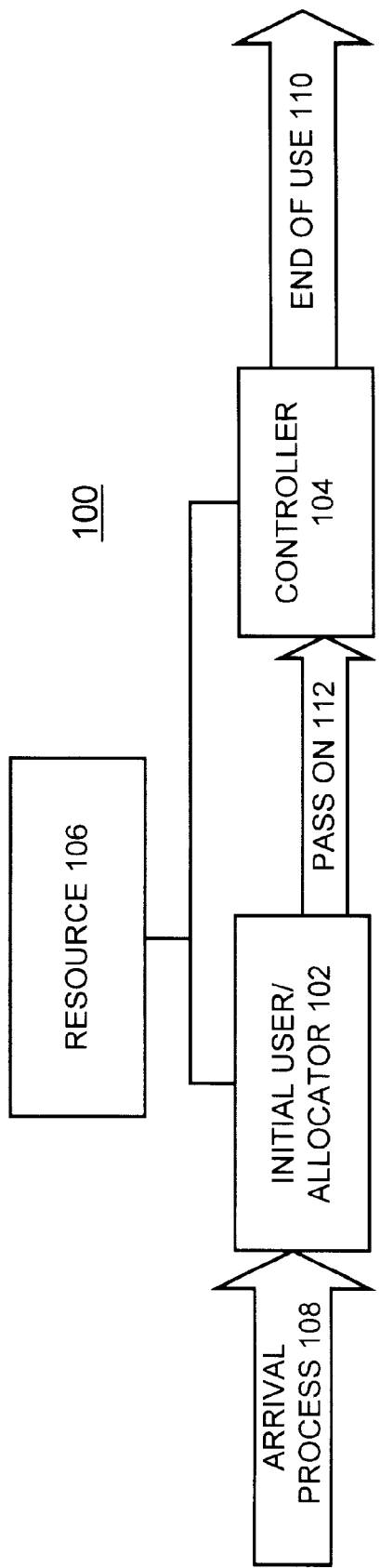
FIG. 1 is a block diagram representation of a resource allocator and controller in a computer communications network resource allocation system of the preferred embodiment.

Having reference now to the drawings, in FIG. 1 there is shown a resource allocator 102 and a controller 104 for predetermined resources 106 in the environment of a computer communications network resource allocation system 100 of the preferred embodiment. As shown in FIG. 1, an arrival process 108 is applied to the allocator 102, which provides requests for the resources 106. There is a departure or end of use process 110 which provides the forgetting function or the end of use function. In between these two functions 108 and 110 are the resources 106, the resource allocator 102 of those resources, and the controller 104 which, asynchronous to the allocator 102, makes provisional allocation decisions, or updates the allocation advice which is then stored for each user in resource allocator 102, so that when the user requests a resource, the allocation decision has already been made. This means that a complex decision making process can be used. For example, in the case of control blocks that are stored in dynamic random access memory (DRAM) where additional accesses are expensive, the decision result can be stored by resource allocator 102 with the receive portion of the control block.

The resource sharing or allocation methods of the present invention advantageously are used in situations where the resource allocator 102 for the resource 106 has limited access to global information, but needs to make a global decision about whether it can provide access to a resource. The controller 104 of the resource 106 determines how to charge for the use of this resource based on the past activities of the current arrival process 108.

In computer communications network resource allocation system 100, the allocator 102 performs the process of allocation for usage of the resource 106, and passes on advice of the resource allocation and deallocation to the controller 104, as indicated at 112 labeled PASS ON. The controller 104 tracks the use of the resource 106 by each identifiable user, incrementing on the beginning of use or at a convenient time before the next use, decrementing on the end of use or the retiring of information based on the use history, and configuring the next choice for the resource allocator 102. The configuration of choice by the controller 104 is triggered by an increment and decrement of the charge or timeout based on end of resource use, and optionally upon a configuration charge. A variety of notifications can be prepared for external processes that can use the advice of the allocator 102 and controller 104 to make configuration changes and to report statistics.

An important advantage of the split of functions between the allocator 102 and the controller 104 is that the resource allocator 102 is reactive to requests, while the controller 104 consider global knowledge. The description of the preferred embodiment for this invention is done in the context of an ATM networks, where users of resources (link bandwidth and buffers) consist of ATM connections or flows. The arrival process 108 from each user or connection consists of data packets that are transmitted in the form of a series of ATM cells. Resources 106, for example, buffer space, need to be allocated upon the arrival of a cell, and resources allocation decisions are made for each such event. It should be understood that resources allocation decisions can be made upon the arrival of the first cell of a data packet, at which point an allocation decision is made for all the subsequent cells of the arriving data packet.

Figure 2:
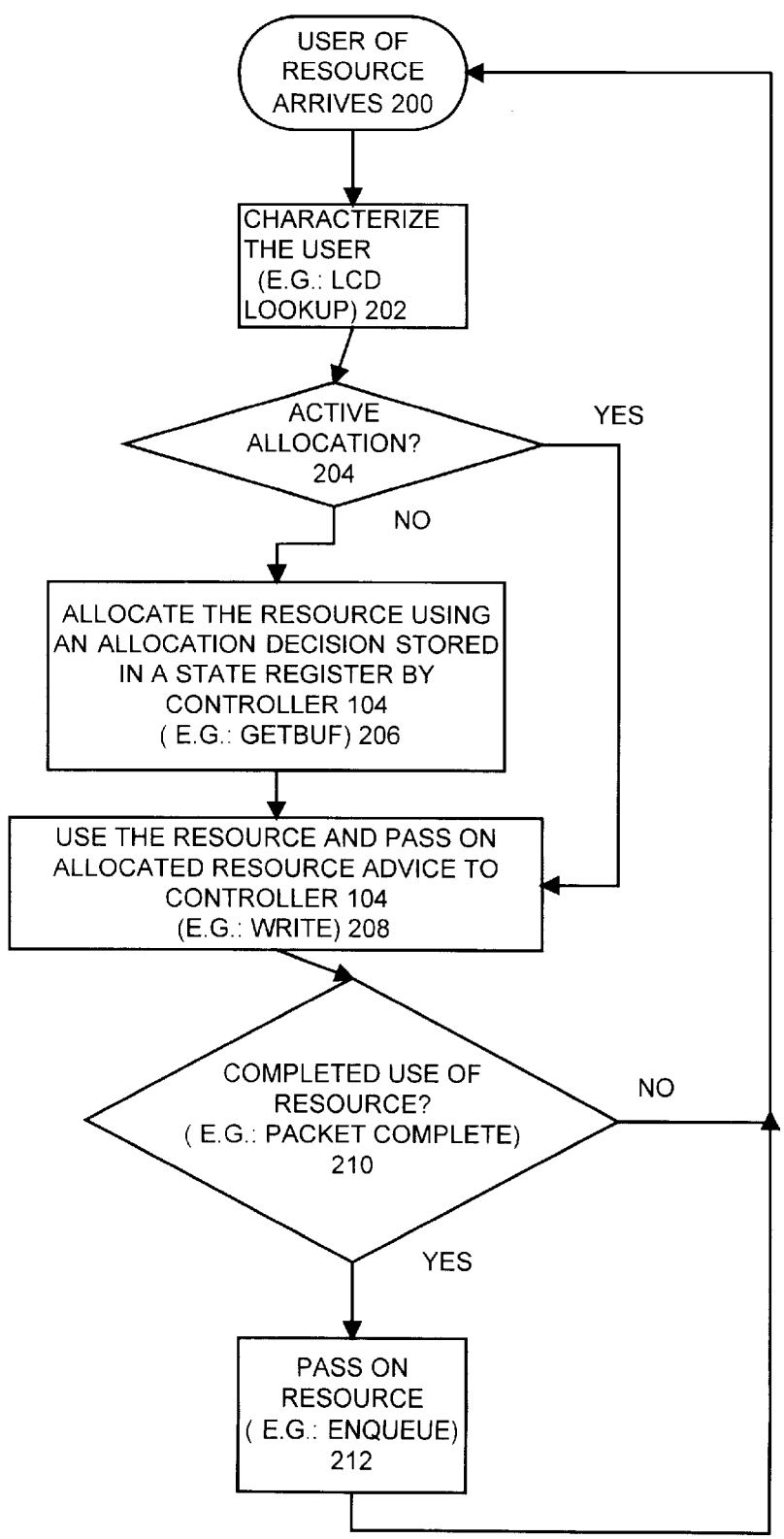
FIG. 2 is a flow chart illustrating sequential operations performed by the resource allocator of the preferred embodiment.

FIG. 2 provides a flow chart illustrating the operation of the resource allocator 102 starting with an arrival of a user of the resource as indicated at a block 200. First the user is characterized, for example, by performing a LCD lookup as indicated at a block 202. Checking for an active allocation for the user is performed as indicated at a decision block 204. When an active allocation for the user is not found, the resource is allocated, for example, obtaining an allocation decision stored in a state register by the controller 104, as indicated at a block 206. Then the resource is used, for example, by writing to memory and passing on advice of the resource allocation to the controller 104, as indicated at a block 208. Checking for a completed use of resource is performed, for example, by checking a packet complete indication, as indicated at a decision block 210. When a completed use of resource is identified, the use of the resource is deallocated, for example, by enqueuing a resource descriptor to the controller 104 as indicated at a block 212.

Figure 3:
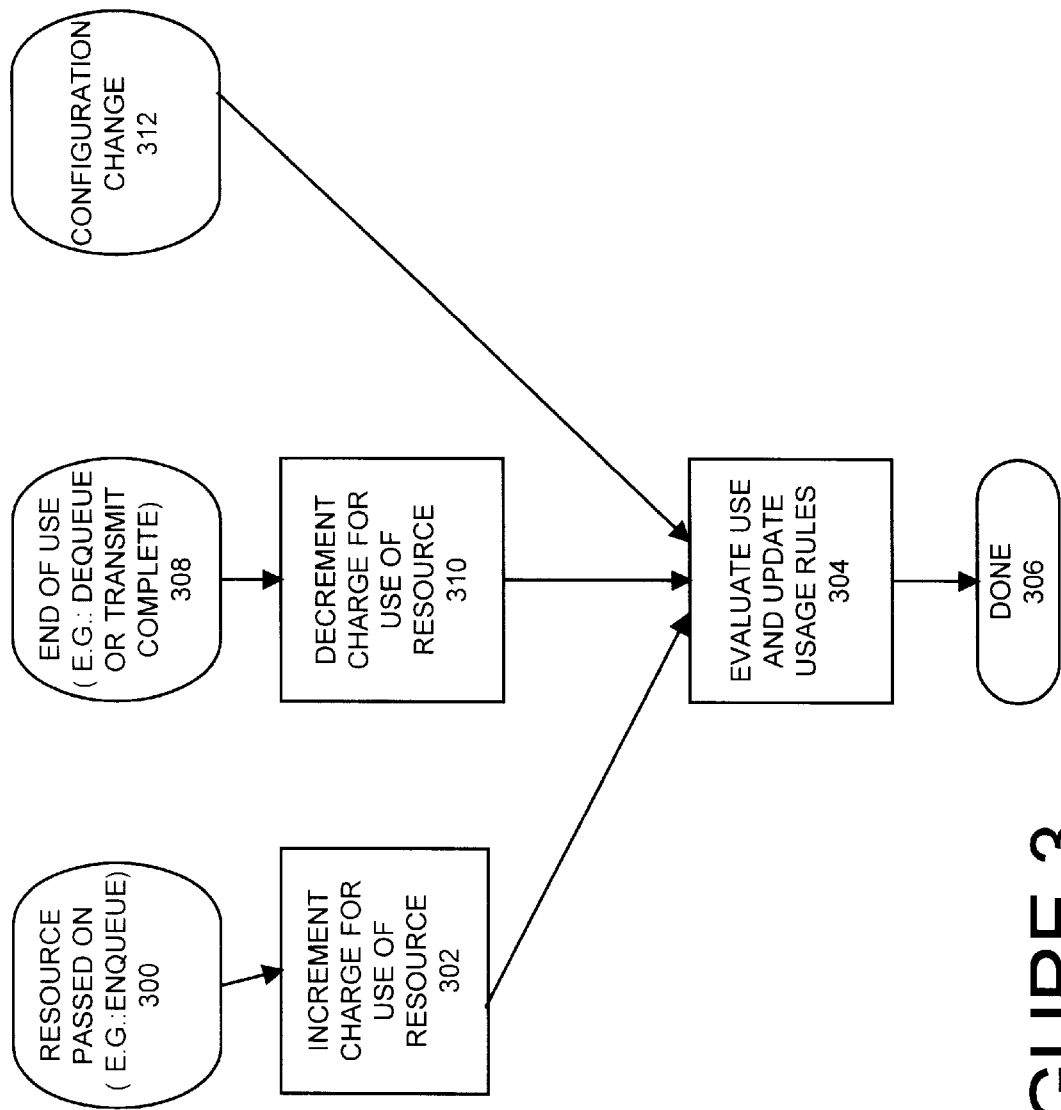
FIG. 3 is a flow chart illustrating sequential operations performed by the controller of the preferred embodiment.

FIG. 3 provides a flow chart illustrating the operation of the controller 104 starting with the allocated resource advice being passed on, for example, the enqueued resource descriptor received from resource allocator 102 as indicated at a block 300. Charge for use of resource is incremented as indicated at a block 302. Use is evaluated and usage rules are updated as indicated at a block 304, configuring the next choice for the resource allocator 102. Sequential operations of the controller 104 are completed as indicated at a block 306. When an end of use, for example, dequeuing the resource descriptor or a transmit complete descriptor is received from resource allocator 102 as indicated at a block 308, then the charge for use of resource is decremented as indicated at a block 310. Then use is evaluated and usage rules again are updated at block 304. A configuration change is received as indicated at a block 312. Then use is evaluated and usage rules again are updated at block 304.

The controller 104 performs the role of a decision maker, arbitrating between the multiple flows and determining which cells are deserving of resources, while the resource allocator 102 performs the actual allocation and deallocation of resources at the behest of the controller. As shown in FIG. 4, the resource 106 is divided into a dedicated resource pool 402 and a shared resource pool 404. When a cell arrives into the network element represented by the arrival process 108, the resource allocator 102 either allocates resources from the dedicated resource pool 402, or from the shared resource pool 404, or denies resources for this cell as determined by the controller 104. The present invention broadly covers a number of different methods for making the resource allocation decision.

Figure 4A:
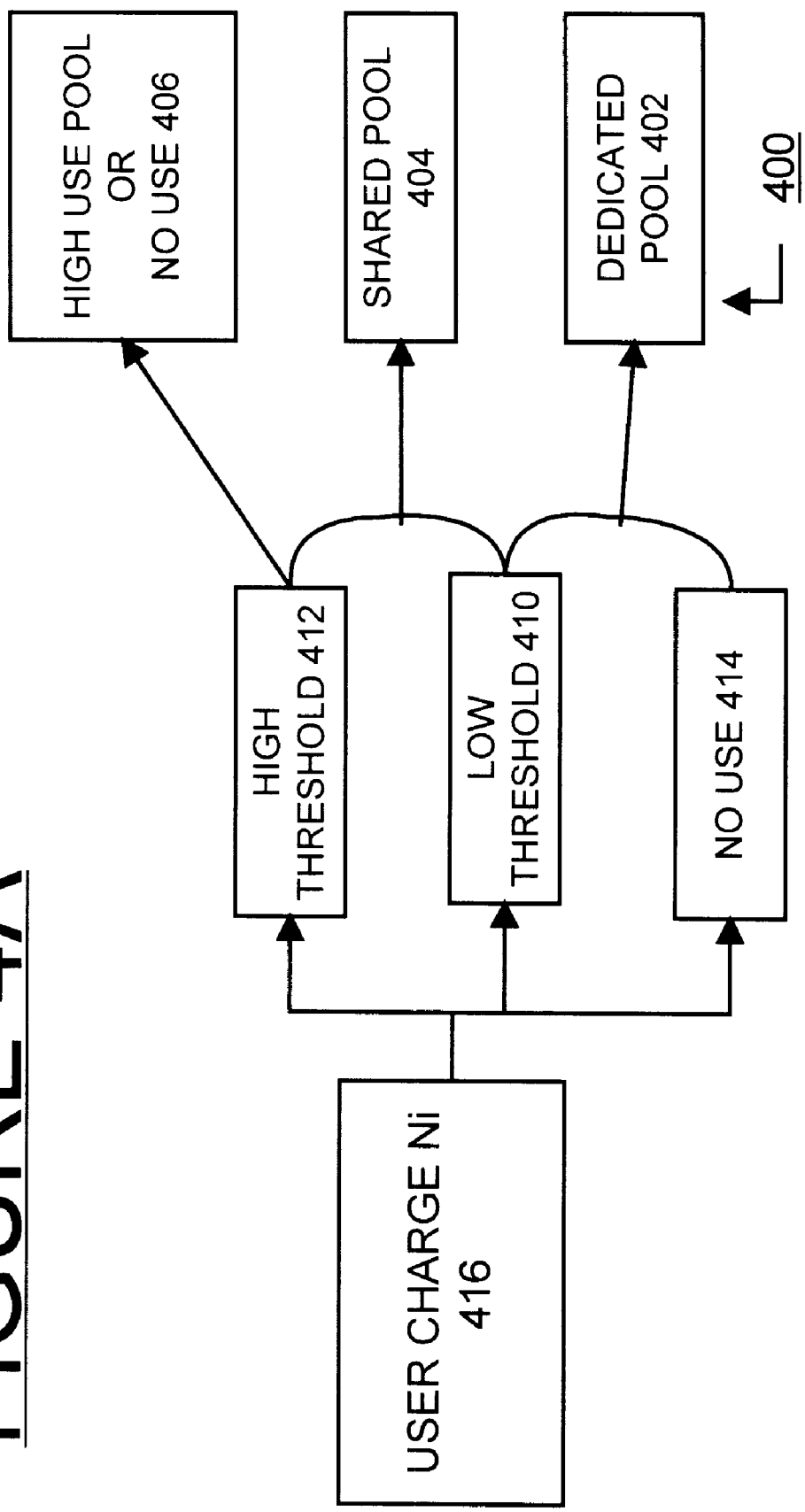
FIG. 4A is a block diagram illustrating a control algorithm for resource allocation on a per connection basis performed by the controller of the preferred embodiment.

FIG. 4A illustrates one algorithm performed by the controller 104 for allocation of the resource 106, such as bandwidth or memory on a per logical channel descriptor (LCD) basis. The computer communications network resource allocation system 100 uses a resource arrangement 400 including at least two pools of resource, one designated the dedicated pool 402, a second designated the shared pool 404, and a third optional high use or no use pool 406. Each user has at least two predetermined thresholds designated low threshold 410 and high threshold 412, and an optional no use 414 and a use counter 416. For example, this simple method for making the resource allocation decision by the controller 104 compares a user (i) charge Ni with the predetermined low threshold 410 and the high threshold 412 corresponding to this flow. Controller 104 provides an allocation decision to the resource allocator 102 so that a cell arriving at the resource allocator 102 is allocated resources from the dedicated pool 402 if resource use Ni by the corresponding flow is less than the low threshold 410, from the shared pool 404 if resource use by the corresponding flow is less than the high threshold 412 while being greater than the low threshold 410, and if resource is available. If the resource use Ni by the corresponding flow is above the high threshold 412, then the user will be configured to take from the high use or no use pool 406 if resource is available or alternatively is denied resources.

Advantages of the memory pool arrangement 400 are that the dedicated pool 402 provides the guarantees. The guaranteed pool of resource 106 or dedicated pool 402 contains enough to match the total of all of the users low threshold. The shared pool 404 provides advantages of statistical multiplexing, being used so that when these resources 404 are not in use by other users, those that need it can use it. Users requirement arrive at different times, and most of the time, much of the system is available for individual users. The present invention provides a floor threshold of guaranteed availability by the dedicated pool 402 with advantages of statistical multiplexing by the shared pool 404.

An example of the utility of the multiple resource pools 402, 404, and optional pool 406, is that the threshold crossings 410, 412, (and optional threshold 414) can be used to change a network available bit rate (ABR) traffic behavior for an ATM ABR network. The ATM ABR network is described in ATM Forum Technical Committee Traffic Management Specification, Version 4.0 (af-tm-0056.000) April, 1996. The threshold crossings 410, 412 advantageously can also be used in the network and link performances of Internet Protocol (IP), or RSVP networks. An Internet Draft document, entitled "Resource ReSerVation Protocol (RSVP)" Version 1 Functional Specification of the Internet Engineering Task Force (IETF) dated Mar. 18, 1996 describes a version 1 of RSVP, a resource reservation setup protocol designed for an integrated services Internet. RSVP provides receiver-initiated setup of resource reservations for multicast or unicast data flows, with good scaling and robustness properties.

Other advantages come from the statistics that are stored and available using the resource allocation method of the invention. The usage parts of the dedicated and shared pools 402, 404 can be used to estimate past and predict future use of the resource 106.

Figure 4B:
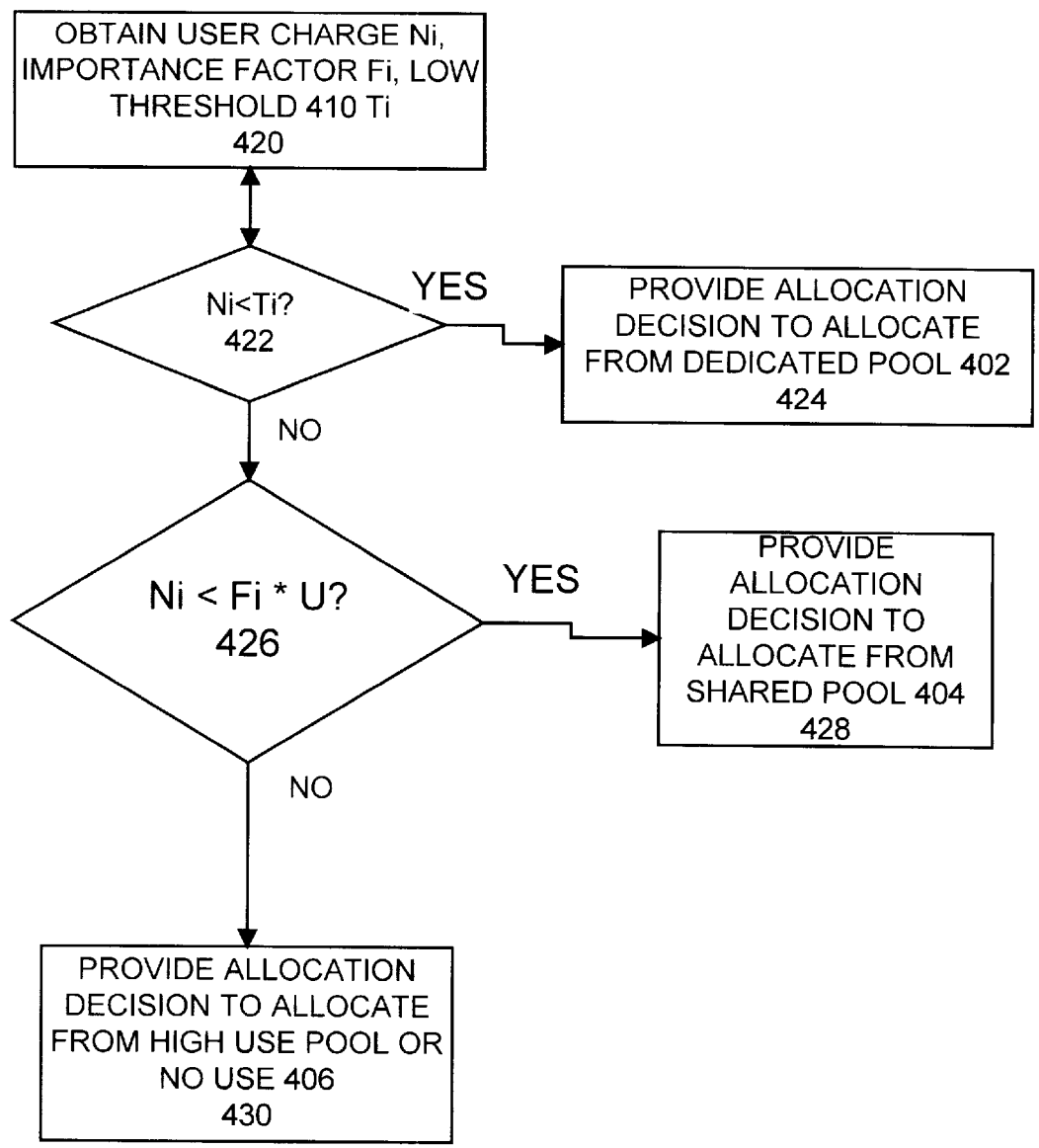
FIG. 4B is a flow chart illustrating alternative sequential operations for resource allocation on a per connection basis performed by the controller of the preferred embodiment.

FIG. 4B illustrates another algorithm performed by the controller 104 for allocation of the resource 106. The alternative method of FIG. 4B uses the predetermined low threshold as described above, and an importance factor Fi greater than or equal to zero corresponding to each flow. The user charge (Ni), importance factor (Fi) and the low threshold Ti is identified for the user as indicated at a block 420. As indicated at a decision block 422, resource use Ni by the corresponding flow is compared with the low threshold Ti. As indicated at a block 424, an allocation decision is provided to the resource allocator 102 to allocate resources 106 from the dedicated pool 402 if resource use Ni by the corresponding flow is less than the low threshold Ti. Otherwise as indicated at a decision block 426, resource use Ni by the corresponding flow is compared with the portion of the shared resources unused (U) by all flows scaled by the importance factor (Fi), for example, the amount of free buffer space that remains in the shared pool 404 times the importance factor Fi. As indicated at a block 428, an allocation decision is provided to the resource allocator 102 to allocate resources 106 from the shared pool 404 if resource use by the corresponding flow is smaller than the importance factor Fi of the flow times the shared resources unused U. Otherwise an allocation decision is provided to the resource allocator 102 to allocate from the high use pool or no use 406 as indicated at a block 428. An advantage of the control method of FIG. 4B over the use of a fixed high threshold, is that dynamic setting of the high threshold 412 is provided as a function of the current occupancy level of the shared pool 404. As a result, an individual flow may be able to use more of the shared resources 404 than it would have under the fixed threshold scheme, when the amount of available resources is high. This translates into higher performance or fewer lost cells, for the system 100.

Figure 4C:
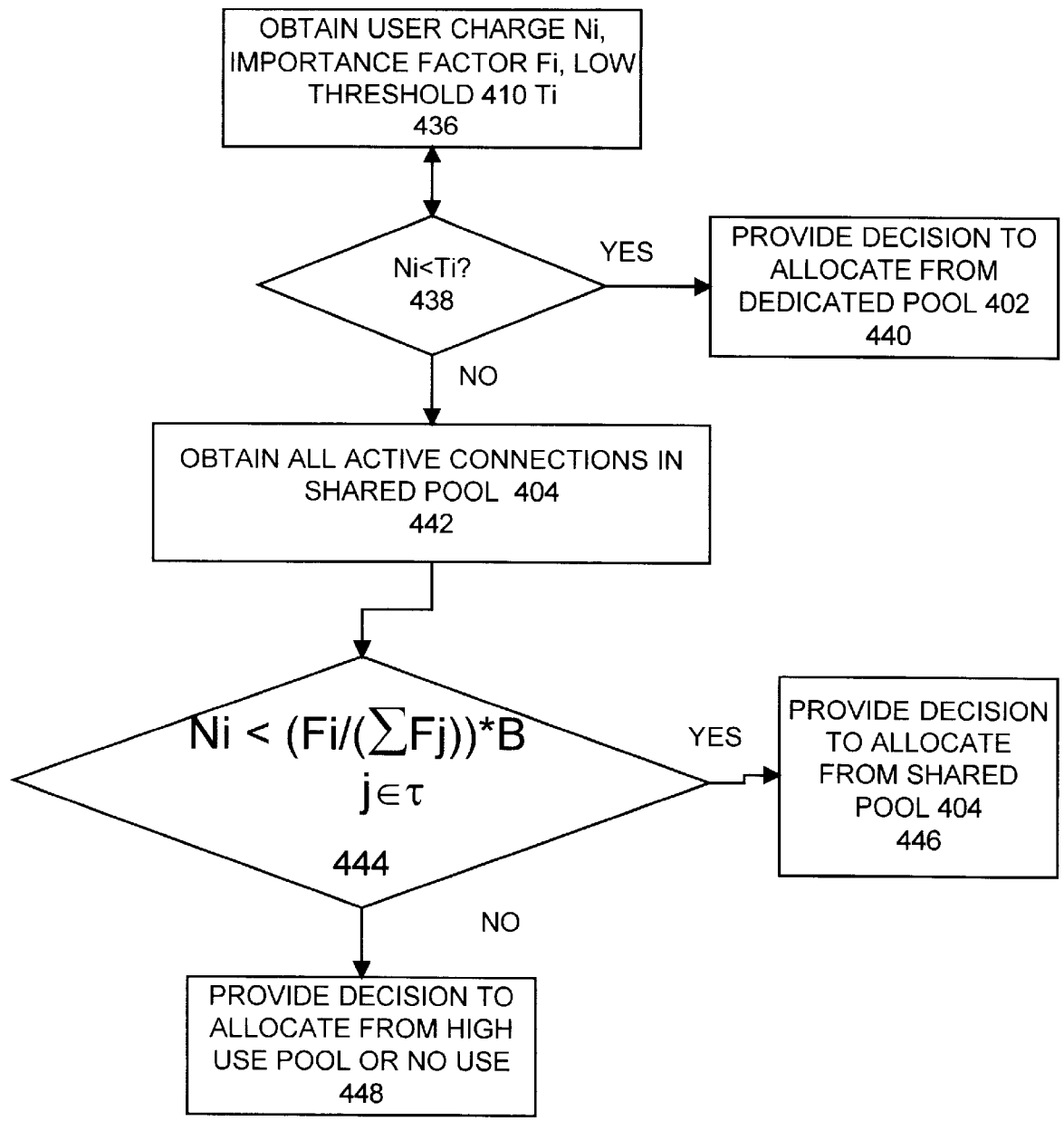
FIG. 4C is a flow chart illustrating further alternative sequential operations for resource allocation on a per connection basis performed by the controller of the preferred embodiment.

FIG. 4C illustrates yet another algorithm performed by the controller 104 for allocation of the resource 106 using the predetermined low threshold and the importance factor Fi as described above. The user charge (Ni), importance factor (Fi) and the low threshold Ti is identified for the user as indicated at a block 436. As indicated at a decision block 438, resource use Ni by the corresponding flow is compared with the low threshold Ti. As indicated at a block 440, an allocation decision is provided to the resource allocator 102 to allocate resources 106 from the dedicated pool 402 if resource use Ni by the corresponding flow is less than the low threshold Ti. Otherwise as indicated at a block 442, all active connections τ are identified. The resource use Ni by the corresponding flow is compared with the importance factor of the flow divided by the importance factors of all active flows, i.e., flows with cells currently stored in the shared buffer pool, and multiplied by the total amount of shared resources (B), as indicated at a decision block 444 labeled $$Ni < \left( Fi \Big/ \left( \sum_{j \in \tau} Fj \right) \right) * B$$

A cell arriving at the resource allocator 102 is allocated resources from the shared pool if resource use Ni by the flow is smaller than the importance factor Fi of the flow divided by the importance factors of all active flows, i.e., flows with cells currently stored in the shared buffer pool, and multiplied by the total amount of shared resources as indicated by the allocation decision provided at a block 446. Otherwise an allocation decision is provided to the resource allocator 102 to allocate from the high use pool or no use 406 as indicated at a block 448. The advantage of this approach over the control method of FIG. 4B, is that a better control of the dynamic sharing among active flows can be provided. This greater control is useful in ensuring a fair sharing of resources among multiple active flows or with proportional importance by a flow to multiple individual importance factors.

It should be understood that methods of FIGS. 4A, 4B, and 4C can be used with the resources allocation decision being made only for the first cell of a packet, where the resource requirements for this first cell are assumed to correspond to that of a typical, for example, maximum or average size, packet. Resources 106 are allocated for subsequent cells of the packet, if and only if, the decision had been made to allocate resources to the first cell. The benefits of this approach is that resource allocation decisions are made on the basis of entities, packets instead of cells, that matter most to users. This is because the loss or failure to allocate resources of a single cell within a packet, typically results in the loss of the entire packet. Hence, resource allocation decisions are best done for each packet, although the actual allocation of physical resources or buffers still is done for each cell. In other words, while the controller 104 makes decisions at the packet level, the allocator 102 uses the packet allocation decision to allocate physical resources for each cell in the packet. In other words, while the controller 104 can make decisions at the packet level, the allocator still operates at the cell level. Having made its decision in any of the above possible ways, the controller 104 updates its records with regards to resource utilization by this flow, and instructs the resource allocator 102 to perform the required allocation or deallocation.

Figure 5C:
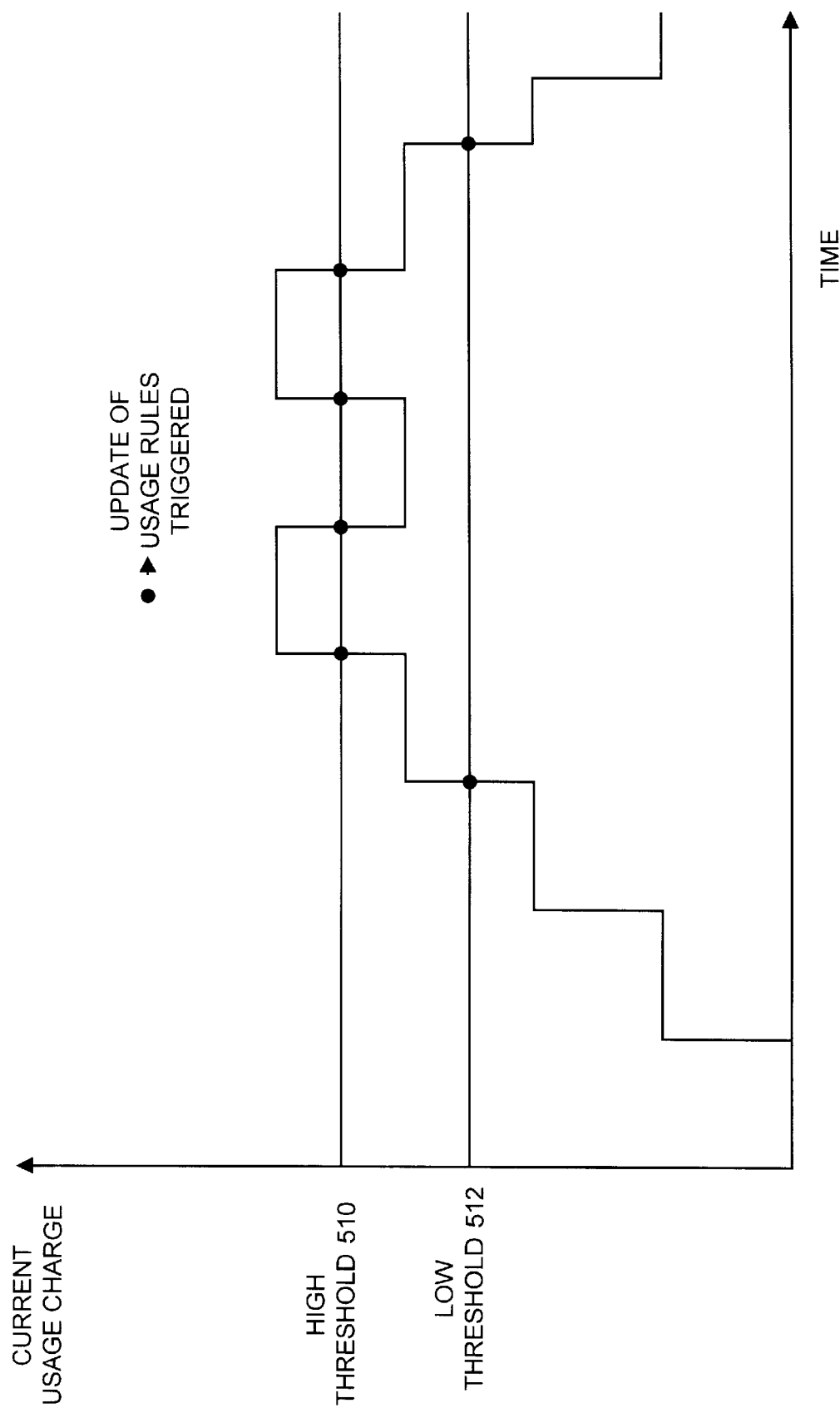

Referring to FIGS. 5A, 5B, and 5C, there are charts illustrating sequential operations performed by resource allocator 102 and controller 104 of the preferred embodiment. In FIGS. 5A, 5B, and 5C, a current usage charge for resource 106 is shown with respect to the vertical axis and time is shown with respect to the horizontal axis.

FIG. 5A illustrates the current usage charge being incremented with each allocated arrival process 108 indicated as RECEIVE and the current usage charge being decremented with each end of use 110 indicated as TRANSMIT.

FIG. 5B illustrates the current usage charge being incremented with multiple arrival processes 108 indicated as ARRIVAL 1, ARRIVAL 2, ARRIVAL 3 and the current usage charge being decremented after a corresponding time interval for the multiple arrival processes 108 indicated as SELECTED TIME INTERVAL FOR CONNECTION 1, SELECTED TIME INTERVAL FOR CONNECTION 2, AND SELECTED TIME INTERVAL FOR CONNECTION 3.

FIG. 5C provides an example usage charge together with a high threshold 510 and a low threshold 512. As shown in FIG. 5C, when the usage charge crosses the high threshold 510 and the low threshold 512, an update of the usage rules is triggered for the controller 104.

Figure 6:
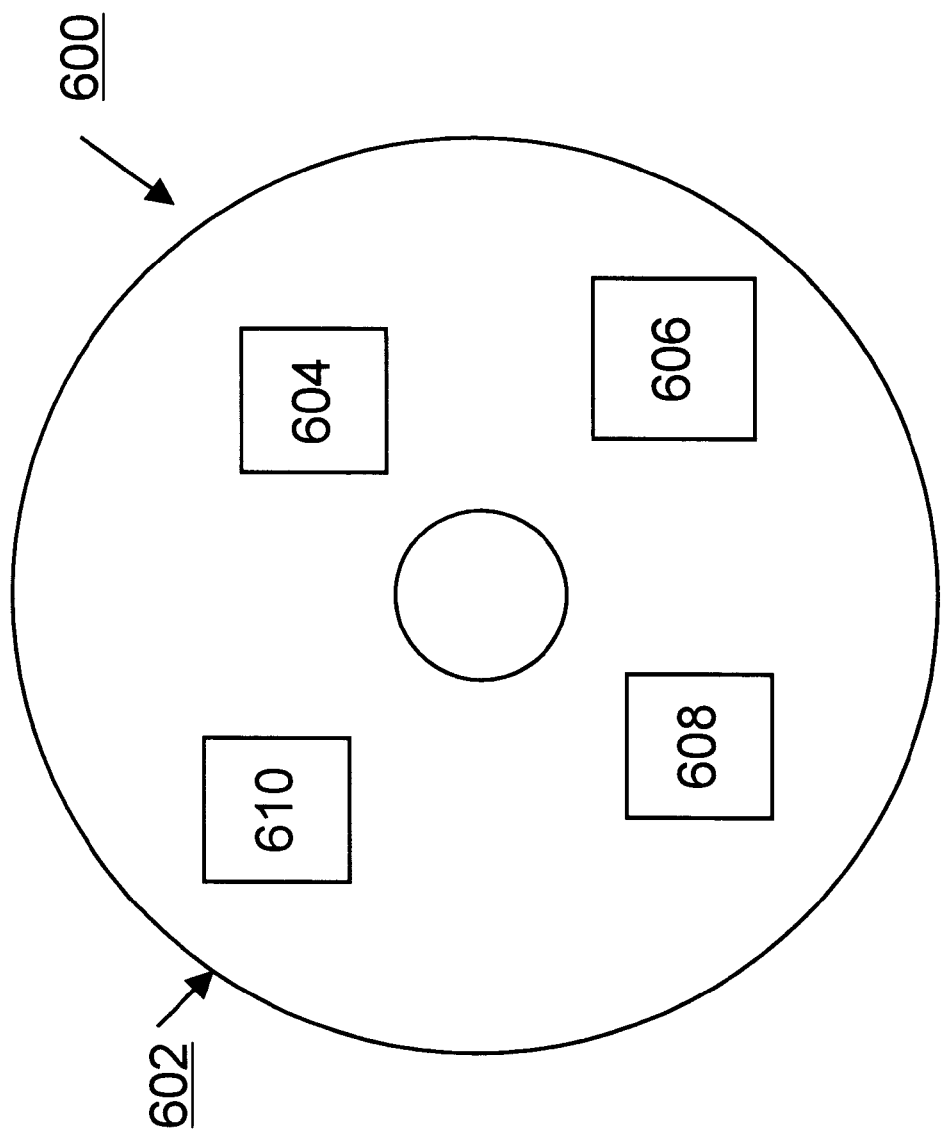
FIG. 6 is a block diagram illustrating a computer program product in accordance with the invention.

Referring now to FIG. 6, an article of manufacture or a computer program product 600 of the invention is illustrated. The computer program product 600 includes a recording medium 602, such as, a floppy disk, a high capacity read only memory in the form of an optically read compact disk or CD-ROM, a tape, a transmission type media such as a digital or analog communications link, or a similar computer program product. Recording medium 602 stores program means 604, 606, 608, 610 on the medium 602 for carrying out the resource allocation methods of the preferred embodiment.

A sequence of program instructions or a logical assembly of one or more interrelated modules defined by the recorded program means 604, 606, 608, 610, direct the resource allocator 102 and the controller 104 for carrying out the resource allocation methods of the preferred embodiment.

While the present invention has been described with reference to the details of the embodiments of the invention shown in the drawing, these details are not intended to limit the scope of the invention as claimed in the appended claims.

What is claimed is:

1. A method for resource allocation with guarantees for a plurality of arrival processes performed by a resource allocator coupled to a controller, said method comprising the steps of:

providing a dedicated resource pool and a shared resource pool;

identifying an arrival process;

obtaining a predefined characterizing value for said identified arrival process;

responsive to said obtained predefined characterizing value, allocating resource from one of said dedicated resource pool or said shared resource pool for said identified arrival process; and utilizing the controller for tracking resource use and for providing the predefined characterizing value for each of the plurality of arrival processes including the steps of:

incrementing a usage charge for said allocated resource from one of said dedicated resource pool or said shared resource pool for said identified arrival process;

decrementing said usage charge for an identified end of use of said allocated resource from one of said dedicated resource pool or said shared resource pool for said identified arrival process;

evaluating resource use for said identified arrival process and calculating a total unused resource in the shared resource pool; and updating said predefined characterizing value for said identified arrival process; wherein the step of updating said predefined characterizing value for said identified arrival process includes the steps of identifying an importance factor for said identified arrival process; calculating a product of said identified importance factor and said calculated total unused resource in the shared resource pool; and comparing said usage charge with a low threshold value and with said product.

2. A method for resource allocation with guarantees as recited in claim 1 includes the step of updating said predefined characterizing value for said identified arrival process for said shared resource pool responsive to said usage charge being greater than said low threshold value and less than said product.

3. A method for resource allocation with guarantees as recited in claim 1 includes the step of updating said predefined characterizing value for said identified arrival process for said dedicated resource pool responsive to said usage charge being less than said low threshold value.

4. A method for resource allocation with guarantees for a plurality of arrival processes performed by a resource allocator coupled to a controller, said method comprising the steps of:

providing a dedicated resource pool and a shared resource pool;

identifying an arrival process;

obtaining a predefined characterizing value for said identified arrival process;

responsive to said obtained predefined characterizing value, allocating resource from one of said dedicated resource pool or said shared resource pool for said identified arrival process; and utilizing the controller for tracking resource use and for providing the predefined characterizing value for each of the plurality of arrival processes including the steps of:

incrementing a usage charge for said allocated resource from one of said dedicated resource pool or said shared resource pool for said identified arrival process;

decrementing said usage charge for an identified end of use of said allocated resource from one of said dedicated resource pool or said shared resource pool for said identified arrival process;

evaluating resource use for said identified arrival process; and updating said predefined characterizing value for said identified arrival process; wherein the step of updating said predefined characterizing value for said identified arrival process includes the steps of identifying an importance factor for each of said plurality of arrival processes; identifying all active arrival processes in the shared resource pool; calculating a product of a ratio of said identified importance factor of said arrival process to the sum of the importance factors of all active arrival processes in the shared resource pool and a total amount of shared resources; and comparing said usage charge with a low threshold value and with said product.

5. A method for resource allocation with guarantees as recited in claim 4 wherein the step of providing said dedicated resource pool and said shared resource pool includes the steps of identifying a total low threshold value equal to the sum of said identified low threshold values; and providing said dedicated resource pool with predetermined resource capacity greater than or equal to said identified total low threshold value.

6. A method for resource allocation with guarantees as recited in claim 4 wherein the step of updating said predefined characterizing value for said identified arrival process includes the steps of comparing said usage charge with said low threshold value and with a high threshold value for said identified arrival process.

7. A method for resource allocation with guarantees as recited in claim 6 includes the step of updating said predefined characterizing value for said identified arrival process for said dedicated resource pool responsive to said usage charge being less than said low threshold value.

8. A method for resource allocation with guarantees as recited in claim 6 includes the step of updating said predefined characterizing value for said identified arrival process for said shared resource pool responsive to said usage charge being greater than said low threshold value and less than said high threshold value.

9. A method for resource allocation with guarantees as recited in claim 4 includes the step of updating said predefined characterizing value for said identified arrival process for said shared resource pool responsive to said usage charge being greater than said low threshold value and less than said product.

10. A method for resource allocation with guarantees as recited in claim 4 includes the step of updating said predefined characterizing value for said identified arrival process for said dedicated resource pool responsive to said usage charge being less than said low threshold value.

11. Apparatus for resource allocation with guarantees for a plurality of arrival processes, said apparatus comprising:

means for providing a dedicated resource pool and a shared resource pool;

means responsive to identifying an arrival process, for obtaining a predefined characterizing value for said identified arrival process;

means responsive to said obtained predefined characterizing value, for allocating resource from one of said dedicated resource pool or said shared resource pool for said identified arrival process; and controller means for tracking resource use and for providing the predefined characterizing value for each of the plurality of arrival processes; said controller means including means for incrementing a usage charge for said allocated resource from one of said dedicated resource pool or said shared resource pool for said identified arrival process;

means for decrementing said usage charge for an identified end of use of said allocated resource from one of said dedicated resource pool or said shared resource pool for said identified arrival process;

means for evaluating resource use for said identified arrival process; and means for updating said predefined characterizing value for said identified arrival process including means for identifying an importance factor for each of said plurality of arrival processes; identifying all active arrival processes in the shared resource pool;

means for calculating a product of a ratio of said identified importance factor of said arrival process to the sum of the importance factors of all active arrival processes in the shared resource pool and a total amount of shared resources; and means for comparing said usage charge with a low threshold value and with said product.

12. Apparatus for resource allocation with guarantees for a plurality of arrival processes as recited in claim 11 wherein said dedicated resource pool has a predetermined resource capacity greater than or equal to a total of a low threshold values for each of the plurality of arrival processes.

13. Apparatus for resource allocation with guarantees for a plurality of arrival processes as recited in claim 11 wherein said controller includes means for decrementing said usage charge responsive to a predetermined time interval for said identified arrival process.

14. A computer program product for use with apparatus for resource allocation with guarantees for a plurality of arrival processes, the computer program product comprising:

a recording medium;

means, recorded on said recording medium, for providing a dedicated resource pool and a shared resource pool;

means, recorded on said recording medium, responsive to identifying an arrival process, for identifying a predefined characterizing value for said identified arrival process;

means, recorded on said recording medium, responsive to said identified predefined characterizing value, for allocating resource from one of said dedicated resource pool or said shared resource pool for said identified arrival process; and means, recorded on said recording medium, for directing a controller to monitor resource use by each of the plurality of arrival processes and update said predefined characterizing value for said identified arrival process including the steps of;

incrementing a usage charge for said allocated resource from one of said dedicated resource pool or said shared resource pool for said identified arrival process;

decrementing said usage charge for an identified end of use of said allocated resource from one of said dedicated resource pool or said shared resource pool for said identified arrival process;

evaluating resource use for said identified arrival process and calculating a total unused resource in the shared resource pool; and updating said predefined characterizing value for said identified arrival process including the steps of identifying an importance factor for said identified arrival process; calculating a product of said identified importance factor and said calculated total unused resource in the shared resource pool; and comparing said usage charge with a low threshold value and with said product.

* * * * *